United States Patent
Zhang (10) Patent No.: US 10,201,151 B2
(45) Date of Patent: Feb. 12, 2019

(54) DOUBLE-LAYER HOLLOW BALL AND TOY WITH THE DOUBLE-LAYER HOLLOW BALL

(71) Applicant: TONGFU MANUFACTURING CO., LTD., Nanjing, Jiangsu (CN)

(72) Inventor: Wen Zhang, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 0 days.

(21) Appl. No.: 15/714,308

(22) Filed: Sep. 25, 2017

(65) Prior Publication Data

US 2018/0098524 A1 Apr. 12, 2018

(30) Foreign Application Priority Data

Oct. 8, 2016 (CN) .................... 2016 2 1102692 U
Dec. 28, 2016 (CN) .................... 2016 2 1456762 U
Jan. 17, 2017 (CN) .................... 2017 2 0058664 U (51) Int. Cl.
  *A01K 15/02* (2006.01)
  *F21V 15/01* (2006.01)
  *F21V 33/00* (2006.01)

(52) U.S. Cl.
  CPC ............ *A01K 15/025* (2013.01); *F21V 15/01* (2013.01); *F21V 33/008* (2013.01)

(58) Field of Classification Search
  CPC ...... A63B 43/06; A01K 15/025; A01K 15/00; A01K 29/00; A01K 15/027
  See application file for complete search history.

(56) References Cited

U.S. PATENT DOCUMENTS

| | | | | |
|---|---|---|---|---|
| 2,903,820 A * | 9/1959 | Bodell | ............... | A63B 43/06 273/DIG. 14 |
| 3,304,651 A * | 2/1967 | Deyerl | ............... | A63B 43/06 200/61.47 |
| 4,002,893 A * | 1/1977 | Newcomb | ............... | A63B 43/06 273/DIG. 20 |
| 5,054,778 A * | 10/1991 | Maleyko | ............... | A63B 43/06 273/DIG. 8 |
| 5,388,825 A * | 2/1995 | Myers | ............... | A63B 43/06 473/570 |
| 6,428,432 B1 * | 8/2002 | Kachel | ............... | A63B 43/06 473/570 |
| 6,666,782 B1 * | 12/2003 | Wu | ............... | A63H 33/22 446/242 |

(Continued)

*Primary Examiner* — Yvonne R Abbott-Lewis
(74) *Attorney, Agent, or Firm* — Oliff PLC (57) ABSTRACT

A double-layer hollow ball, including: an outer hollow ball, inner hollow body, and illuminant. A surface of the outer hollow ball is provided with outer through holes, and a surface of the inner hollow body is provided with inner through holes; the outer hollow ball includes an upper part of the outer hollow ball, a main body of the outer hollow ball, and a lower part of the outer hollow ball; upper and lower end surfaces of the main body of the outer hollow ball are connected to the upper part of the outer hollow ball and the lower part of the outer hollow ball, respectively; and the illuminant is provided within the inner hollow body and the inner hollow body is connected to the outer hollow ball via a support column. The double-layer hollow ball is light-weight, robust, strong and elastic, with a prolonged life for outdoor use.

13 Claims, 8 Drawing Sheets

(56) References Cited

U.S. PATENT DOCUMENTS

| | | | |
|---|---|---|---|
| 6,770,012 B2* | 8/2004 | Kuo | A63B 21/22 |
| | | | 446/235 |
| 7,074,106 B1* | 7/2006 | Deutsch | A01K 15/025 |
| | | | 119/711 |
| 7,210,816 B2* | 5/2007 | Lin | A63B 43/06 |
| | | | 362/234 |
| 8,652,012 B2* | 2/2014 | Smith | A63B 21/22 |
| | | | 446/233 |
| 2001/0049311 A1* | 12/2001 | Lewis | A63B 43/06 |
| | | | 473/570 |
| 2006/0057932 A1* | 3/2006 | Gick | A01K 15/025 |
| | | | 446/269 |
| 2006/0249096 A1* | 11/2006 | Gick | A01K 15/025 |
| | | | 119/707 |
| 2010/0048359 A1* | 2/2010 | Chuang | A63B 21/22 |
| | | | 482/44 |
| 2011/0214616 A1* | 9/2011 | Levin | A01K 15/00 |
| | | | 119/707 |
| 2011/0237367 A1* | 9/2011 | Kodama | A63B 43/00 |
| | | | 473/570 |
| 2015/0237828 A1* | 8/2015 | Peavey | A01K 15/025 |
| | | | 119/707 |
| 2015/0237830 A1* | 8/2015 | Sternal | A01K 15/027 |
| | | | 119/702 |
| 2016/0273738 A1* | 9/2016 | Wolfinbarger | A63B 41/00 |

* cited by examiner

DOUBLE-LAYER HOLLOW BALL AND TOY WITH THE DOUBLE-LAYER HOLLOW BALL

BACKGROUND

Technical Field

The present utility model belongs to the field of pet toys, and specifically relates to a double-layer hollow ball and a toy with the double-layer hollow ball.

Related Art

Attracting the pet to play by using a pet toy is an effective manner to enhance affection between a person and a pet. However, this is usually selected to be done in the outdoor because of a limited area of a house. However, the pet toy damages easily while being used because of the hard and bumpy ground in the outdoor. The pet toy gets broken over time so that the bouncing capability and rolling capability of the pet toy will be greatly affected, thereby reducing the pet's interest in playing.

Therefore, developing a pet toy to deal with the foregoing situation is an urgent problem to be resolved by a person skilled in the art.

SUMMARY

To resolve the foregoing problem, the present utility model discloses a double-layer hollow ball and a toy with the double-layer hollow ball.

To achieve the foregoing objective, the present utility model provides the following technical solutions:

A double-layer hollow ball, including an outer hollow ball, an inner hollow body, and an illuminant, where a surface of the outer hollow ball is provided with outer through holes, and a surface of the inner hollow body is provided with inner through holes; the outer hollow ball includes an upper part of the outer hollow ball, a main body of the outer hollow ball, and a lower part of the outer hollow ball; upper and lower end surfaces of the main body of the outer hollow ball are connected to the upper part of the outer hollow ball and the lower part of the outer hollow ball, respectively; and the illuminant is provided within the inner hollow body and the inner hollow body is connected to the outer hollow ball via a support column. The foregoing structure ensures that the double-layer hollow ball in the present utility model is robust and strong and is more adaptable to the outdoor environment.

Preferably, any section of the outer hollow ball is formed by smoothly connecting at least two sections of arcs, and a central connecting line of any two sections of adjacent arcs is located at inner sides of the arcs. The design ensures that the entire outer hollow ball is spherical, and ensures the bounce and rolling of the outer hollow ball.

Preferably, any section of the outer hollow ball is a polygon.

Preferably, any section of the outer hollow ball is serrated.

Preferably, the surface of the outer hollow ball is provided with protrusions.

The surface of the outer hollow ball in the present utility model is provided with protrusions for the pet to chew and meanwhile, this provides further buffering when the double-layer hollow ball falls to the ground, thereby ensuring that the double-layer ball in the present utility model is robust and strong.

Preferably, the outer through holes are evenly provided at the surface of the outer hollow ball, and the inner through holes are evenly provided at the surface of the inner hollow body.

Preferably, the outer through holes are unevenly provided at the surface of the outer hollow ball, and the inner through holes are unevenly provided at the surface of the inner hollow body.

Preferably, the illuminant is provided with a transparent spherical housing.

The illuminant in the present utility model is designed to have a transparent spherical housing and ensure that the double-layer hollow ball in the present utility model is able to emit light and enhance interaction with the pet.

Preferably, both the outer hollow ball and the inner hollow body are made of soft rubber in a double-layer structure.

Preferably, an inner side of the outer hollow ball is evenly provided with housing reinforcing strips; and the housing reinforcing strips are located between two adjacent outer through holes to form a grid-like shape.

The outer hollow ball and the inner hollow body in the present utility model are made of soft rubber in a double-layer structure, and housing reinforcing strips in a grid-like shape are evenly provided between the outer through holes at the inner side of the outer hollow ball. This structure can not only ensure the elasticity of the double-layer structure in the present utility model, but also extend the lives of the outer hollow ball and the inner hollow body.

Preferably, one end of a truncated-cone-shaped support column that is close to the outer hollow ball is smaller, and an inner surface of the main body of the outer hollow ball is evenly provided with locating slots matching the support columns; or the support column between the outer hollow ball and the inner hollow body is integrated with the outer hollow ball and the inner hollow body as a whole.

In the present utility model, one end of the truncated-cone-shaped support column that is close to the outer hollow ball is smaller, and an inner surface of the main body of the outer hollow ball is evenly provided with locating slots matching the support columns; or the support column between the outer hollow ball and the inner hollow body is integrated with the outer hollow ball and the inner hollow body as a whole. This design can ensure the stable connection of the inner hollow body and the main body of the outer hollow ball and reduce the affect on the elasticity of the outer hollow ball to the lowest.

Preferably, both the upper part of the outer hollow ball and the lower part of the outer hollow ball are inwardly provided with reinforcing columns, the ends of which close to the illuminant match the surface of the illuminant.

The present utility model provides a toy with the double-layer hollow ball according to the present utility model, where the shape of the upper part of the outer hollow ball is a shape of an animal head.

In the present utility model, the shape of the upper part is a shape of an animal head, thereby enabling the toy to be more attractive to pets and increase the fun of the toy. In the present utility model, inner sides of both the upper part of the outer hollow ball and the lower part of the outer hollow ball are inwardly provided with reinforcing columns matching the surface of the illuminant, thereby ensuring the steadiness of the illuminant in the inner hollow body, and effectively preventing the illuminant from falling out of the inner hollow body because of a collision. Therefore, the product life and performance of the double-layer hollow ball in the present utility model are ensured.

As compared with the prior art, the double-layer hollow ball in the present utility model is lightweight, robust, strong and elastic, with a prolonged service life for outdoor use. Moreover, the double-layer hollow ball in the present utility model can emit visible light to improve the performance of the product and enhance interaction with the pet.

List of reference signs: inner hollow body 1, illuminant 2, outer through hole 3, inner through hole 3', upper part of the outer hollow ball 4, main body of the outer hollow ball 5, lower part of the outer hollow ball 6, support column 7, housing reinforcing strip 8, locating slot 9, reinforcing column 10, outer hollow ball 11, protrusion 12.

DETAILED DESCRIPTION

The technical solutions provided by the present utility model are described below in detail with reference to specific embodiments. It should be understood that the following specific embodiments are merely intended to describe the present utility model, but are not intended to limit the scope of the present utility model.

Figure 1:
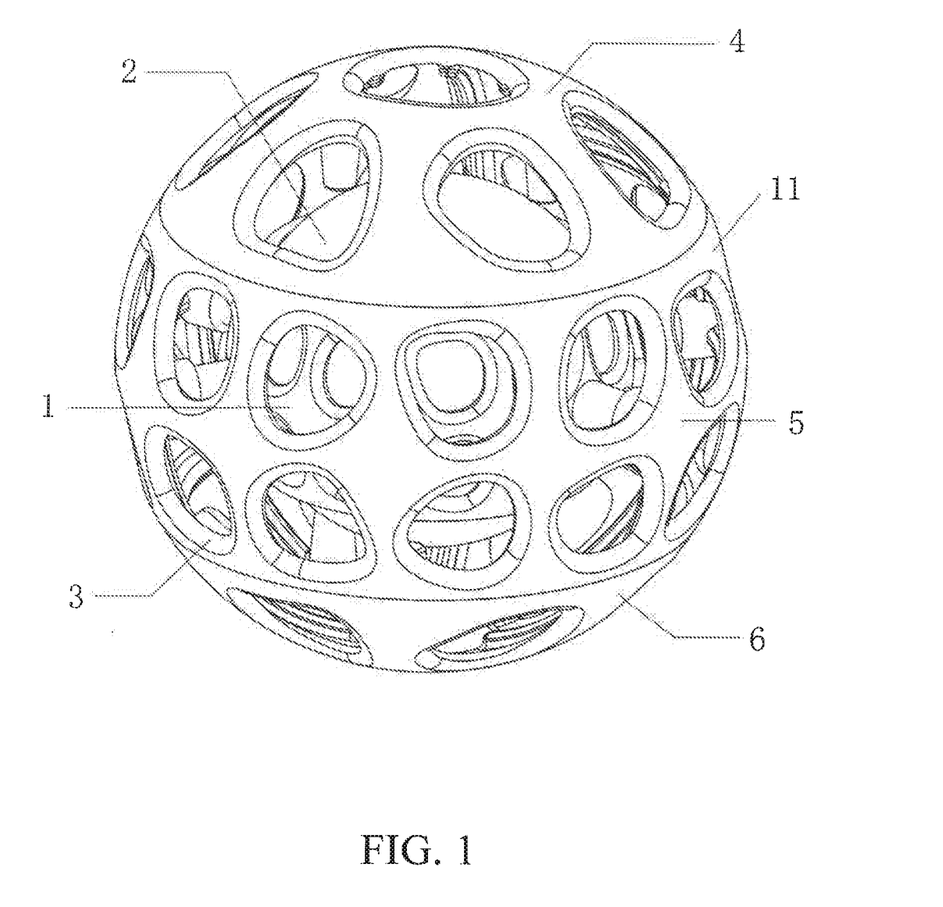
FIG. 1 is a schematic structural diagram of a double-layer hollow ball according to the present utility model.

FIG. 1 shows a schematic structural diagram of a double-layer hollow ball according to the present utility model. The present utility model relates to a double-layer hollow ball, including an outer hollow ball 11, and inner hollow body 1, and an illuminant 2. The outer hollow ball 11 and the inner hollow body 1 are made of soft rubber in a double-layer structure.

Figure 2:
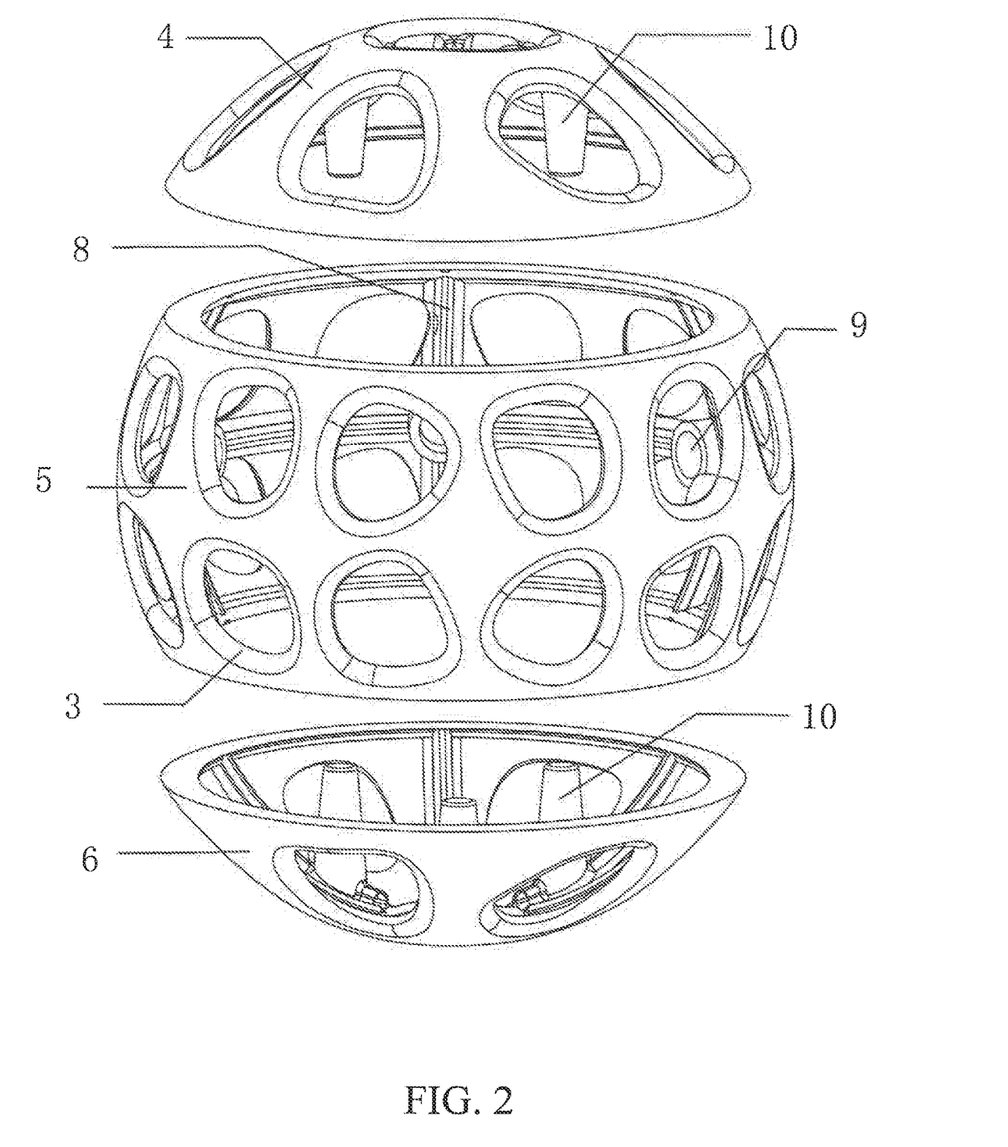
FIG. 2 is a schematic structural diagram of an outer hollow spherical ball according to the present utility model.

As shown in FIG. 2, a surface of the outer hollow ball 11 is provided with outer through holes 3, and a surface of the inner hollow body 1 is provided with inner through holes 3'. An inner side of the outer hollow ball 11 is evenly provided with housing reinforcing strips 8, and the housing reinforcing strips 8 are located between two adjacent outer through holes 3 to form a grid-like shape. The outer hollow ball 11 includes an upper part 4 of the outer hollow ball, a main body 5 of the outer hollow ball, and a lower part 6 of the outer hollow ball. Upper and lower end surfaces of the main body 5 of the outer hollow ball are connected to the upper part 4 of the outer hollow ball and the lower part 6 of the outer hollow ball, respectively. An inner surface of the main body 5 of the outer hollow ball is evenly provided with locating slots 9. Both the upper part 4 of the outer hollow ball and the lower part 5 of the outer hollow ball are inwardly provided with reinforcing columns 10, the ends of which close to the illuminant 2 match a surface of the illuminant 2.

As shown in FIG. 2, any section of the outer hollow ball 11 is formed by smoothly connecting at least two sections of arcs, and a central connecting line of any two sections of adjacent arcs is located at inner sides of the arcs.

Figure 8:
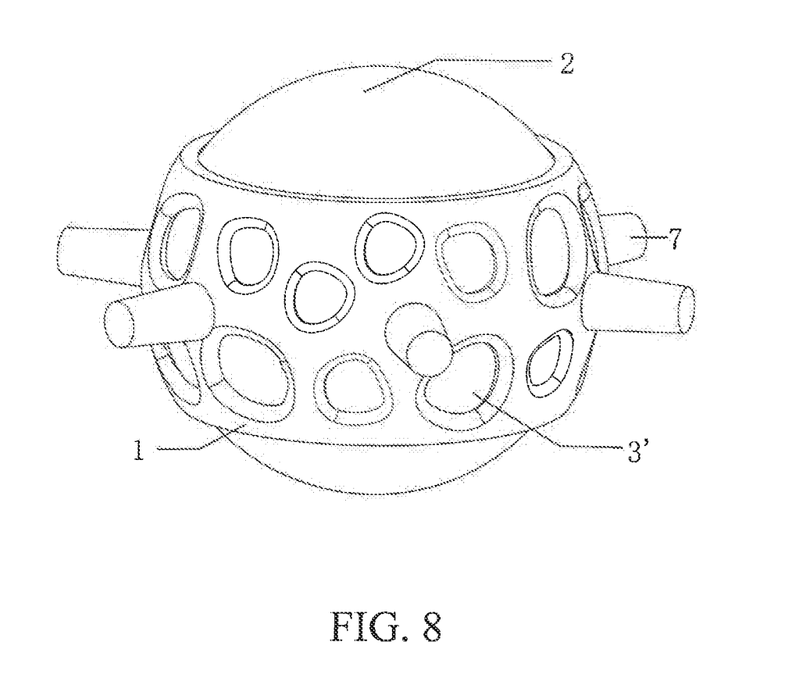
FIG. 8 is a schematic diagram of inner through holes unevenly provided at a surface of an inner hollow body according to the present utility model.

As shown in FIG. 2, the outer through holes 3 are evenly provided at the surface of the outer hollow ball (11); and as shown in FIG. 8, the inner through holes 3' are evenly provided at the surface of the inner hollow body 1.

Figure 3:
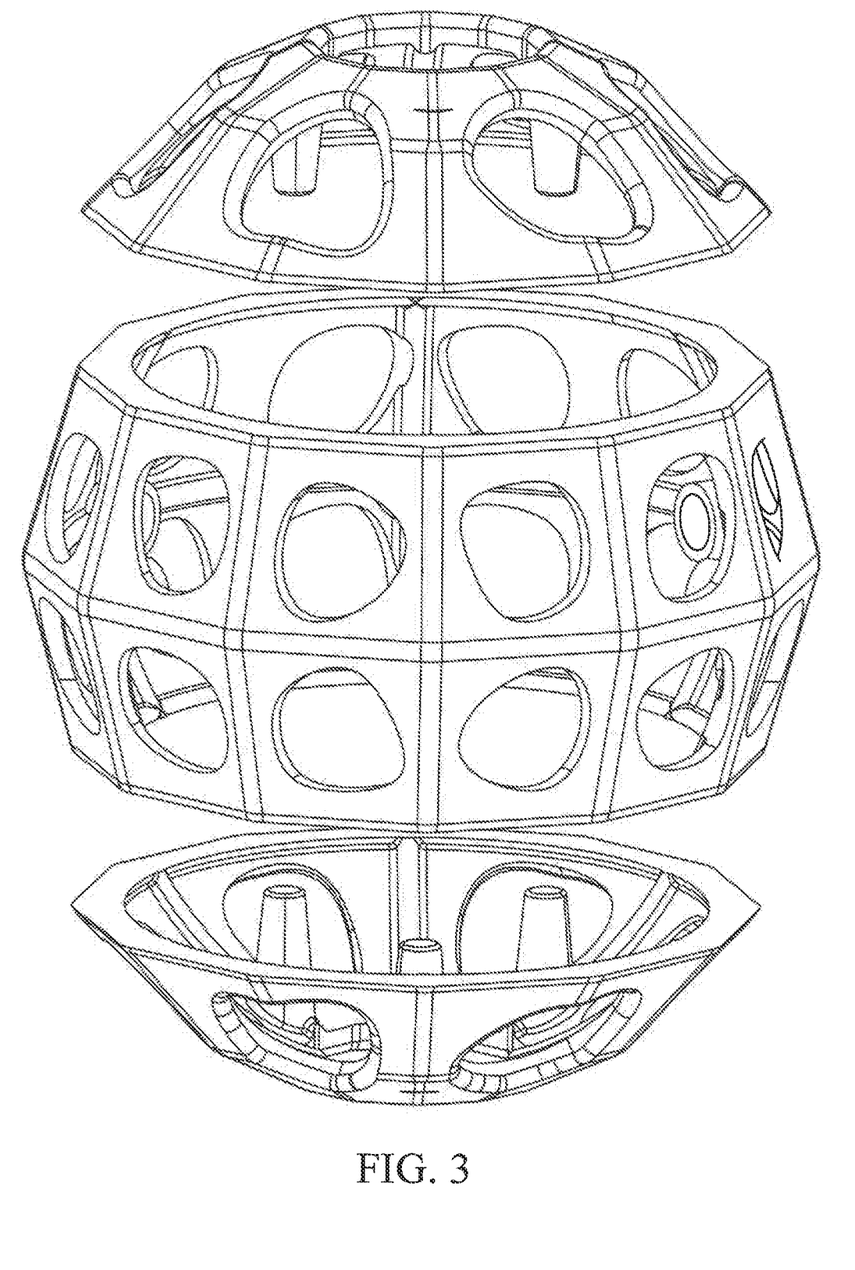
FIG. 3 is a schematic structural diagram of an outer hollow polygonal ball according to the present utility model.

As shown in FIG. 3, any section of the outer hollow ball 11 is a polygon.

Figure 4:
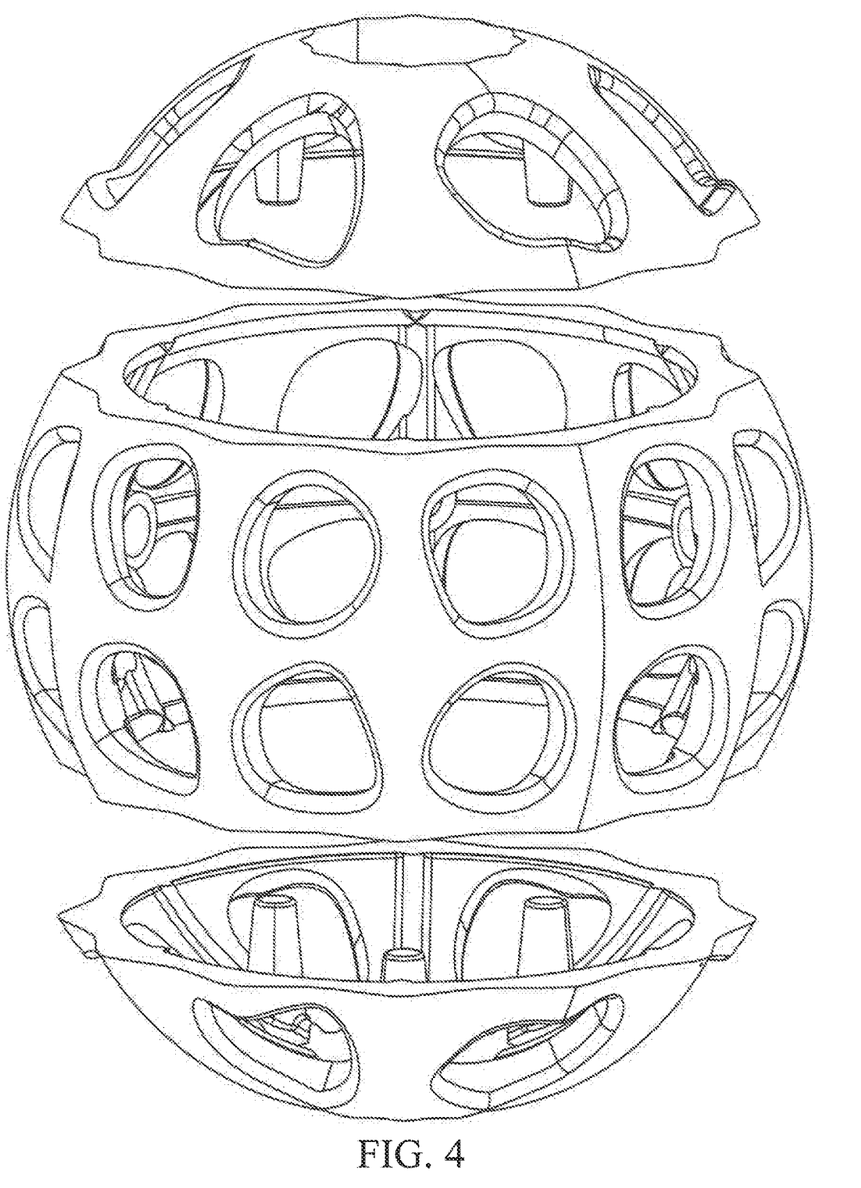
FIG. 4 is a schematic structural diagram of an outer hollow serrated ball according to the present utility model.

As shown in FIG. 4, any section of the outer hollow ball 11 is serrated.

Figure 5:
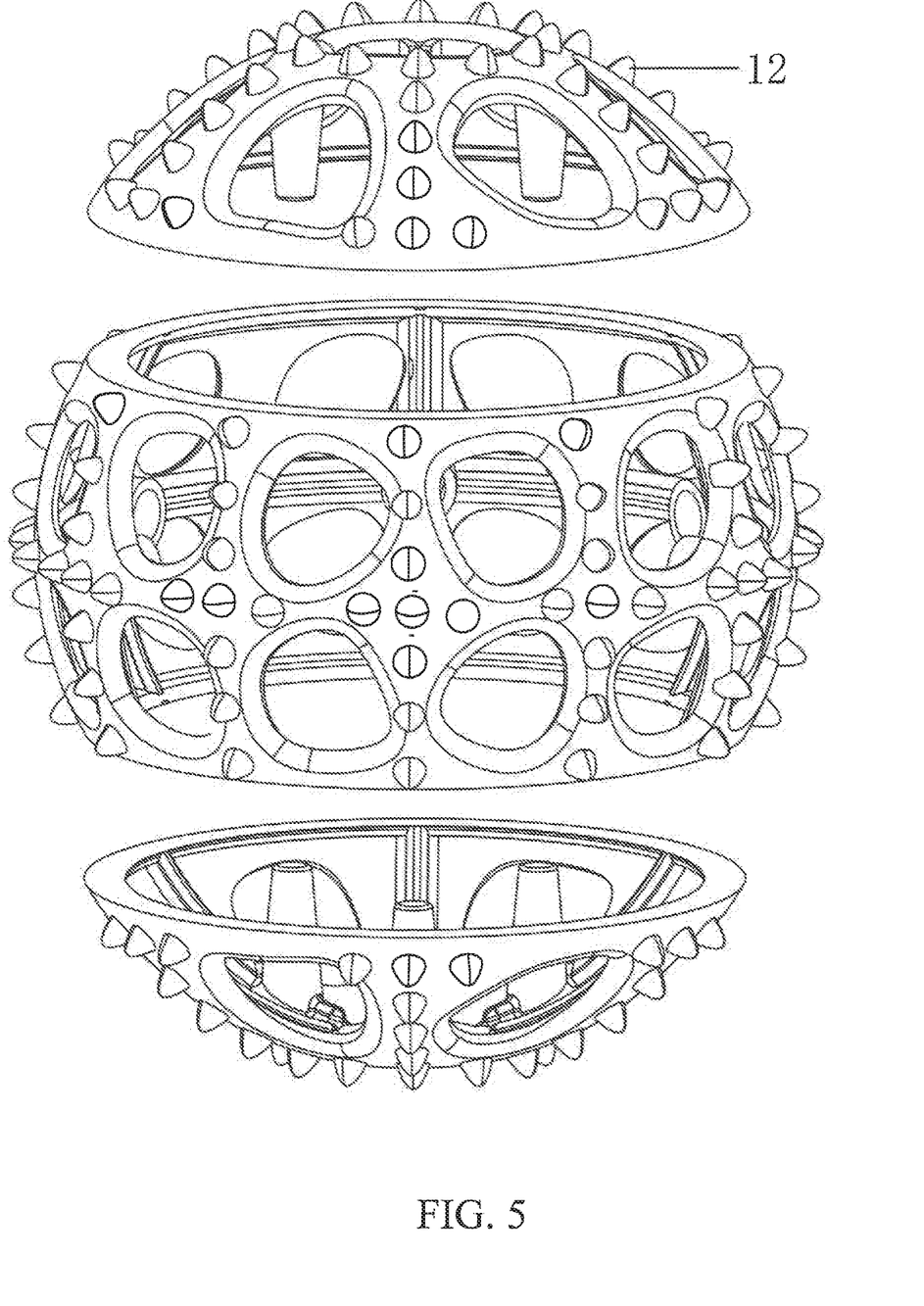
FIG. 5 is a schematic structural diagram of an outer hollow ball provided with protrusions according to the present utility model.

As shown in FIG. 5, the surface of the outer hollow ball 11 is provided with protrusions 12.

Figure 6:
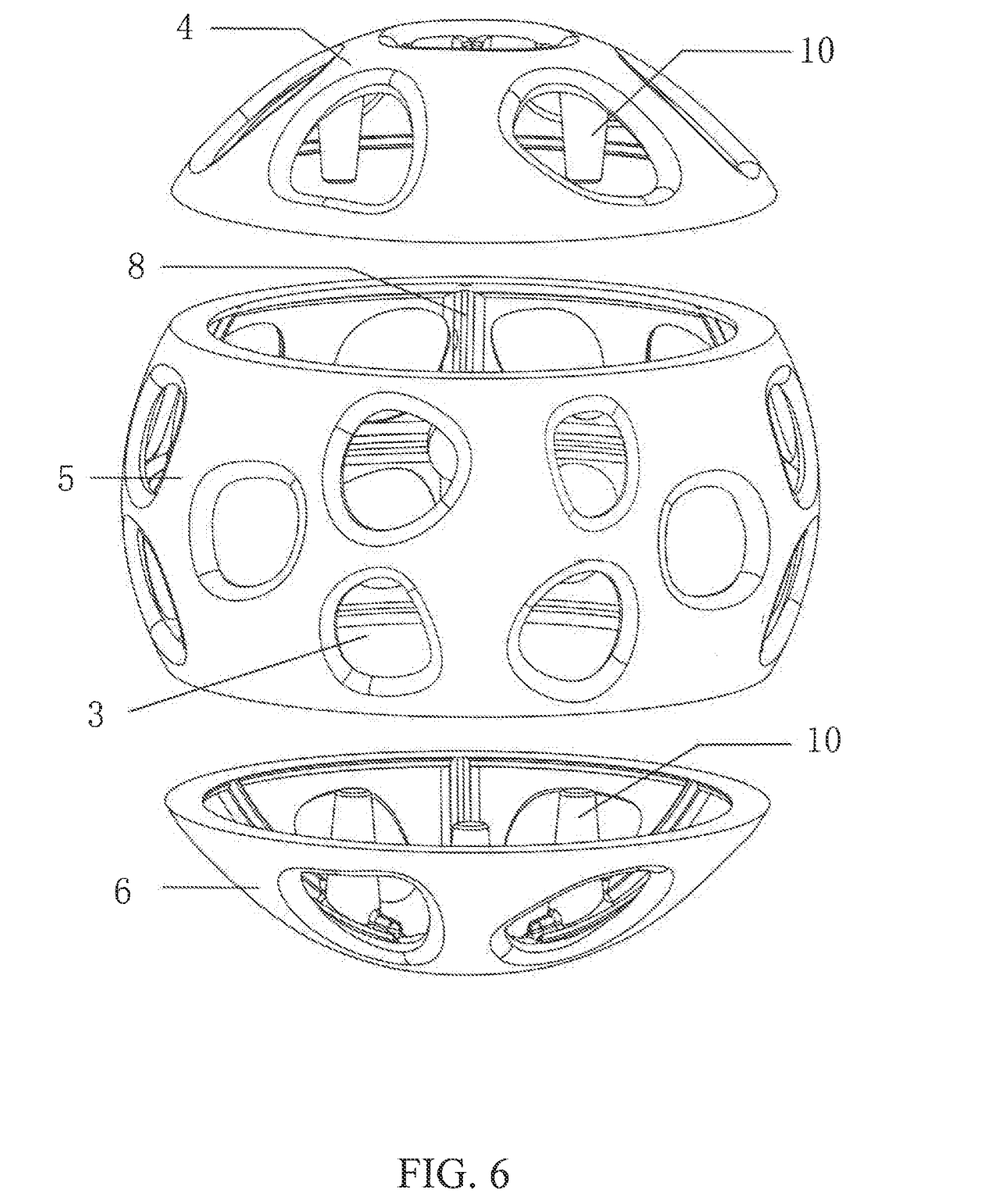
FIG. 6 is a schematic diagram of outer through holes unevenly provided at a surface of an outer hollow ball according to the present utility model.

As shown in FIG. 6, the outer through holes 3 are unevenly provided at the surface of the outer hollow ball 11.

Figure 7:
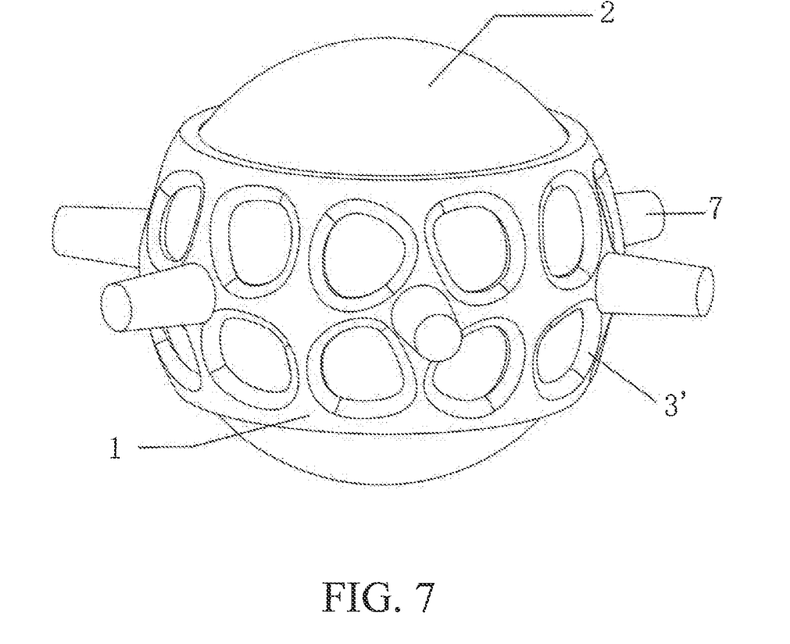
FIG. 7 is a schematic structural diagram of an inner hollow body and an illuminant according to the present utility model.

As shown in FIG. 7, the inner hollow body 1 is provided within the outer hollow ball 11, and the inner hollow body 1 is connected to the outer hollow ball 11 via the support columns 7. One end of the truncated-cone-shaped support column 7 that is close to the outer hollow ball 11 is smaller, and an inner surface of the main body 5 of the outer hollow ball is evenly provided with locating slots 9 matching the support columns 7.

The illuminant 2 is provided with a transparent spherical housing, and is provided within and mated to the inner hollow body 1.

As shown in FIG. 8, the inner through holes 3' are unevenly provided at the surface of the inner hollow body 1.

Figure 9:
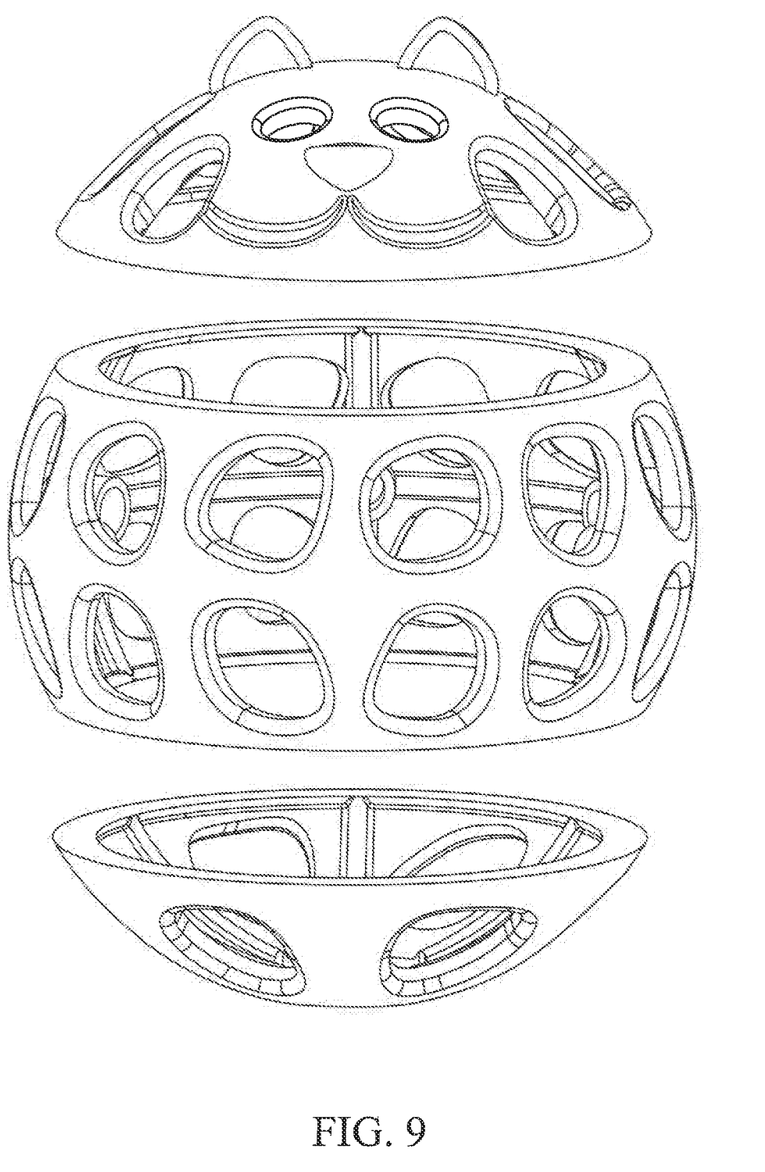
FIG. 9 is a schematic structural diagram of an outer hollow ball of a toy with a double-layer hollow ball according to the present utility model.

As shown in FIG. 9, the shape of the upper part 4 of the outer hollow ball 11 is a shape of an animal head.

Finally, it should be noted that the foregoing embodiments are merely intended to describe the technical solutions of the present utility model, and are not intended to limit the technical solutions. A person of ordinary skill in the art should understand that modifications or equivalent replacements made to the technical solutions of the present utility model without departing from the purpose and scope of the technical solutions shall fall within the scope of the claims of the present utility model.

What is claimed is:

1. A double-layer hollow ball, comprising: an outer hollow ball, an inner hollow body, and an illuminant; wherein a surface of the outer hollow ball (11) is provided with outer through holes, and a surface of the inner hollow body is provided with inner through holes; the outer hollow ball) comprises an upper part of the outer hollow ball, a main body of the outer hollow ball, and a lower part of the outer hollow ball; upper and lower end surfaces of the main body of the outer hollow ball are connected to the upper part of the outer hollow ball and the lower part of the outer hollow ball, respectively; and the illuminant is provided within the inner hollow body and the inner hollow body is connected to the outer hollow ball via support columns.

2. The double-layer hollow ball according to claim 1, wherein any section of the outer hollow ball is formed by smoothly connecting at least two sections of arcs, and a central connecting line of any two sections of adjacent arcs is located at inner sides of the arcs.

3. The double-layer hollow ball according to claim 1, wherein any section of the outer hollow ball is a polygon.

4. The double-layer hollow ball according to claim 1, wherein any section of the outer hollow ball is serrated.

5. The double-layer hollow ball according to claim 1, wherein the surface of the outer hollow ball is provided with a protrusion.

6. The double-layer hollow ball according to claim 1, wherein the outer through holes are evenly provided at the surface of the outer hollow ball, and the inner through holes are evenly provided at the surface of the inner hollow body.

7. The double-layer hollow ball according to claim 1, wherein the outer through holes are unevenly provided at the surface of the outer hollow ball, and the inner through holes are unevenly provided at the surface of the inner hollow body.

8. The double-layer hollow ball according to claim 1, wherein the illuminant is provided with a transparent spherical housing.

9. The double-layer hollow ball according to claim 1, wherein both the outer hollow ball and the inner hollow body are made of soft rubber in a double-layer structure.

10. The double-layer hollow ball according to claim 1, wherein an inner side of the outer hollow ball is evenly provided with housing reinforcing strips; and the housing reinforcing strips are located between two adjacent outer through holes to form a grid-like shape.

11. The double-layer hollow ball according to claim 1, wherein one end of the truncated-cone-shaped support column that is close to the outer hollow ball is smaller, and an inner surface of the main body of the outer hollow ball is evenly provided with locating slots matching the support columns; or the support column between the outer hollow ball and the inner hollow body is integrated with the outer hollow ball and the inner hollow body as a whole.

12. The double-layer hollow ball according to claim 1, wherein both the upper part of the outer hollow ball and the lower part of the outer hollow ball are inwardly provided with reinforcing columns, the ends of which close to the illuminant match a surface of the illuminant.

13. A toy with the double-layer hollow ball according to claim 1, wherein the shape of the upper part of the outer hollow ball is a shape of an animal head.

* * * * *